(12) United States Patent
Schoess

(10) Patent No.: US 6,652,740 B2
(45) Date of Patent: Nov. 25, 2003

(54) PRESSURE SENSING FLUID FILTER SYSTEM

(75) Inventor: Jeffrey N. Schoess, Buffalo, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/950,145

(22) Filed: Sep. 10, 2001

(65) Prior Publication Data

US 2003/0047517 A1 Mar. 13, 2003

(51) Int. Cl.[7] ............................................. B01D 35/143
(52) U.S. Cl. ................... 210/90; 210/440; 210/443; 340/626; 73/727
(58) Field of Search ........................... 210/85, 90, 440, 210/443, DIG. 17, 497.1; 340/451, 607, 611, 626, 627; 338/42, 47; 73/726, 727, 753, 754

(56) References Cited

U.S. PATENT DOCUMENTS

| 2,251,648 | A | | 8/1941 | Wayman |
|---|---|---|---|---|
| 2,810,034 | A | | 10/1957 | Grant |
| 2,879,892 | A | | 3/1959 | Frakes |
| 3,644,915 | A | | 2/1972 | McBurnett |
| 3,654,414 | A | | 4/1972 | Kudlaty |
| 4,480,160 | A | | 10/1984 | Stifelman |
| 4,885,082 | A | | 12/1989 | Cantoni |
| 5,569,373 | A | | 10/1996 | Smith et al. |
| 5,674,380 | A | | 10/1997 | Cioara |
| 5,858,224 | A | * | 1/1999 | Schwandt et al. |
| 5,989,700 | A | * | 11/1999 | Krivopal |
| 6,471,853 | B1 | * | 10/2002 | Moscaritolo |

* cited by examiner

Primary Examiner—Terry K. Cecil

(57) ABSTRACT

An apparatus for determining hydraulic pressure within a pressure sensing fluid filter assembly includes a pressure-sensing polymer thick film transducer associated with an oil filter assembly. Preferably, pressure sensors are provided on both the oil inlet and outlet areas of the filter. The pressure-sensing transducers send signals to a control module, which may compare pressure readouts at the inlet and outlet sides of the filter. Based on the pressure in the filter, the on-board sensing system will detect a clogged filter condition, and if necessary, the control module will send a signal to an in-dash display terminal, to indicate that an oil change is needed.

3 Claims, 5 Drawing Sheets

PRESSURE SENSING FLUID FILTER SYSTEM

BACKGROUND OF THE INVENTION

1. Field of the Invention

The present invention relates to a system, method and apparatus for monitoring hydraulic pressure in a fluid filter, and for detecting filter clogging. More particularly, the present invention relates to a system, method and apparatus including a fluid filter assembly which incorporates one or more thick-film pressure sensors.

2. Description of the Background Art

Preserving and maintaining oil quality is important to maximizing the useful life of an internal combustion engine. Similarly, the detection of oil contamination and deterioration, in an internal combustion engine, is important in prolonging the useful life of the engine.

The useful life of motor oil depends on many factors, including engine condition, ambient operating conditions, vehicle usage, vehicle servicing, and type of oil used.

While most car manufacturers recommend changing the engine oil of an automobile at three months or three thousand miles, whichever comes first, many automobile owners and operators fail to regularly change the engine oil of their automobile within the recommended timeframe.

Where deteriorated oil is subject to prolonged use because of infrequent oil changes, the useful life of an automobile engine is greatly reduced.

It is well known that if a fluid filter becomes partially clogged, the hydraulic pressure increases therein, upstream of the clogged filter element, because greater pressure is required to force fluid through the clogged filter.

As a result of the above concerns, some relevant oil pressure monitoring equipment has been developed.

Some electromechanical switches have been developed to sense oil pressure, and to send a signal to an operator when the pressure value, or a pressure differential, exceeds a threshold value. Examples of these pressure-sensing switches may be found in U.S. Pat. Nos. 2,251,648, 2,810,034, 2,879,892, 3,644,915, 3,654,414, and 4,480,160. The switches in the above-cited references normally incorporate a spring-biased diaphragm, or a spring-biased piston, and are generally separate from any associated filters or filter assemblies.

Some oil filter assemblies, incorporating electromechanical pressure sensing switches, have also been developed to monitor oil pressure within the filter, and to send a signal to an operator when the pressure in the filter exceeds a threshold value, indicating that the filter element has become clogged. Examples of oil filter/sensor assemblies may be found in U.S. Pat. Nos. 2,879,892, 4,885,082, 5,569,373 and 5,674,380.

While the known devices have shown some utility for their intended purposes, a need still exists in the fluid monitoring art for an improved pressure-sensing oil filter apparatus including a low-cost pressure sensor. An oil filter assembly that measured a pressure differential between the inlet and outlet zones within a hydraulic oil filter would be particularly beneficial to vehicle owners.

An improved oil filter/sensor assembly is needed that can be serviced or changed by non-expert service personnel or by a vehicle owner or, if desired, when the device wears. In particular, there is a need for an oil filter/sensor assembly incorporating one or more small cost-effective sensors, suitable for high-volume production.

SUMMARY OF THE INVENTION

The present invention has been developed to overcome the foregoing limitations and disadvantages of known oil quality sensors, and to generally fulfill a need in the art for an improved oil filter/pressure sensor assembly, which provides cost-effective and ongoing oil quality monitoring.

In accordance with one of the preferred embodiments hereof, the present invention includes an oil quality monitoring system including an oil filter/tapping plate with built-in sensor assembly, a flexible circuit tape connector, a differential amplifier circuit, a radio frequency (RF) transmitter and an antenna.

Accordingly, it is an object of the present invention to provide a method and apparatus for monitoring the condition of an oil filter, through in-situ analysis In-situ monitoring offers a superior method of detection, as it monitors the actual oil circulated through the engine. However, proper location of the in-situ device is important for accurate monitoring, i.e. the sensor should be located in a spot where oil is actively circulated, rather than in a 'dead spot' (a location with little or no flow). The highest cycling area of engine oil is within or near the oil filter, and accordingly, the present invention incorporates in-situ detection using a sensor which is made part of an oil filter assembly.

Such an in-situ oil monitoring device is advantageous because incorporation of the sensor into an otherwise conventional oil filter permits the inventive system to be retrofitted to any car, rather than limiting application to new cars only. This capability permits vehicle owners of virtually all makes and models to reap the benefits of oil quality monitoring, which preserves life of their vehicles' engines. Incorporating the sensor into the oil filter also affords a cost-effective method of oil monitoring, as it requires no specifically designated mounting area and no separate maintenance; and a worn sensor is automatically removed and replaced, as part the oil filter assembly, during an oil change.

Another object of the present invention is to provide a flexible polymer thick film (PTF) as a component of the sensor. A printed sensor pattern on a polymer film permits the sensor to conform to the shape of the surface into which it would be integrated, which provides for installation in tight locations or between two fitting surfaces where conventional sensors cannot fit. As a result, the sensor is capable of fitting on a tapping plate of an otherwise conventional oil filter.

Still another object of the present invention is to use multiple pressure sensors implemented as a force-sensitive resistive PTF material, which includes electrically conducting particles suspended in a non-conducting binder material. These binder materials may be polymers, polyesters, silicone or any other non-conductive material; while the semiconductor filler nanoparticles may be carbon black, copper, gold, silica, or any other sufficiently conductive material.

Two matched PTF pressure sensors are, preferably, placed on opposite sides of the filter tapping plate. The location of the PTF sensors provides monitoring of both filter inlet pressure and filter outlet pressure.

Each sensor operates as an electrical resistor element that decreases its bulk resistance when an external force (i.e. fluid pressure) is applied thereto. Applying external force (i.e. fluid pressure) to the PTF causes the conductive particles to move closer together and even to contact each other in some instances, causing the overall electrical resistance to decrease. A decrease in the resistance occurs due to localized increased concentration of the conductive particles in the polymer binder.

Yet another object of the present invention is to include a circuit connector to the sensor element, in which the connector is provided by conductive PTF ink. The circuit connector relays information from the pressure sensors within the PTF to a differential sensing amplifier circuit within an electronic control module, which converts the two single ended output voltages (i.e. the inlet and outlet pressure) into an equivalent differential voltage output.

A further object of the present invention is to include a differential sensing amplifier wherein two dedicated voltage divider circuits ratiometrically convert resistance values for inlet and outlet pressure into equivalent voltage outputs. The inlet pressure signal is conditioned by a voltage follower stage whose output is connected to the positive terminal of the difference amplifier. The outlet pressure signal is also conditioned by a dedicated voltage follower and connected to the negative terminal of the difference amplifier. The difference value (inlet pressure-outlet pressure) is output by the differential amplifier stage to the RF transmitter to be transmitted to the vehicle user.

By way of example, a PTF pressure sensor pattern with an inner diameter of 0.8125 inch, outer diameter of 0.9375 inch, lead attachment spacing of 0.1875 inch, lead attachment length of 0.25 inch, and ink mix ratio factor of 0.15 inch to 1 has an average equivalent of 4.15 megaohms of electrical resistance at 0 pounds per square inch (psi) and 3.6 megaohms of electrical resistance at 60 psi. The sensor output slope value is $-29.3 \times 10^3$ and linearity fit factor (R2) is 0.988. The filter differential pressure range for most passenger vehicles is from 0 to 60 psi.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

1. Overview

The present invention, as noted, provides a system, method and apparatus for monitoring pressure within a fluid filter assembly 10, and for sending a message to a user when the pressure exceeds a predetermined value. The present invention is based on the use of a pressure sensing fluid filter assembly 10 incorporating at least one, and preferably two separate thick-film pressure sensors. In a preferred embodiment of the invention, the filter assembly 10 includes dual pressure sensors 28, 30 to monitor both inlet and outlet pressure and the differential therebetween.

2. Fluid Filter Assembly

Figure 1:
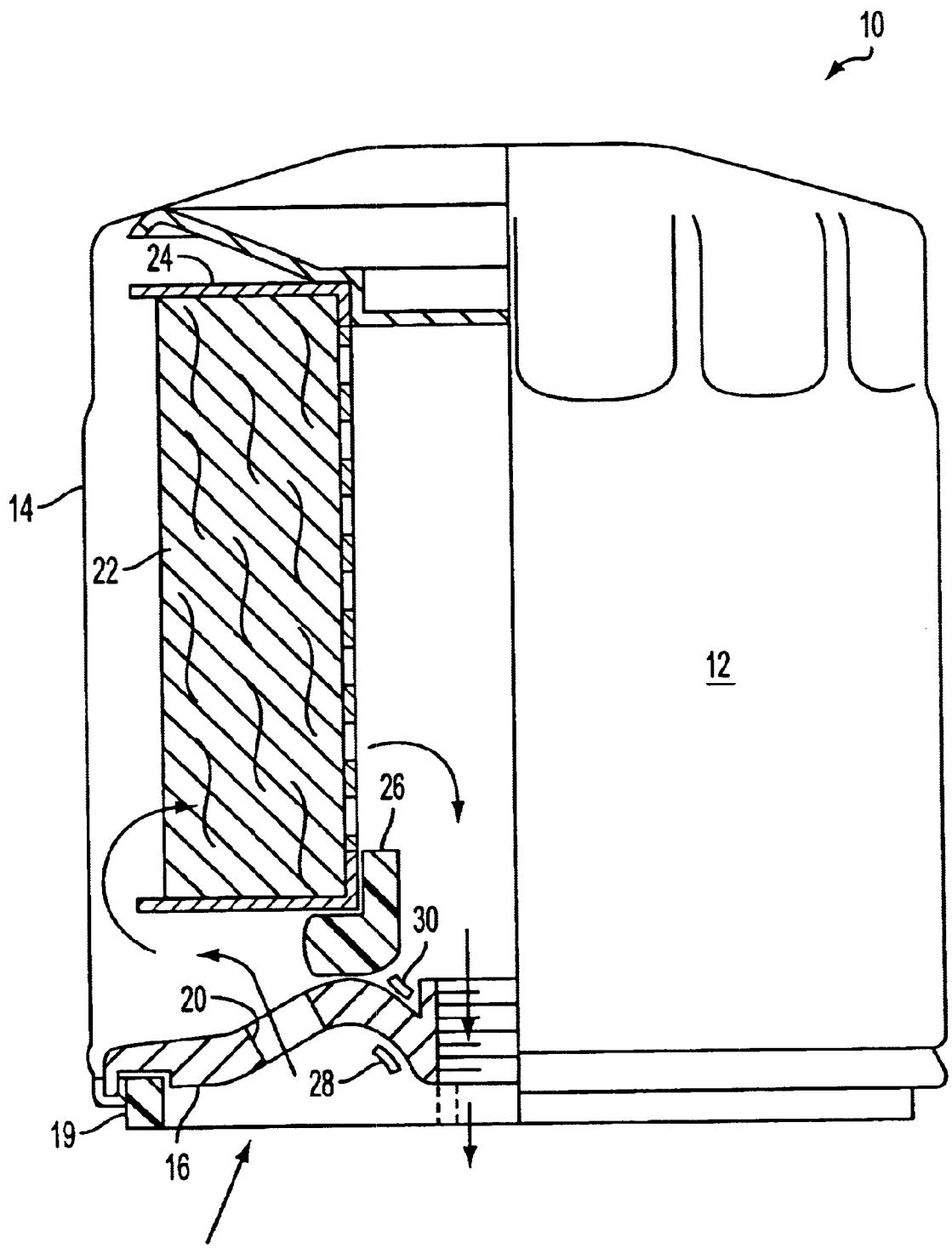
FIG. 1 is a side plan view, partially in cross-section, of an oil filter/sensor assembly in accordance with a first embodiment of the invention.
Figure 2:
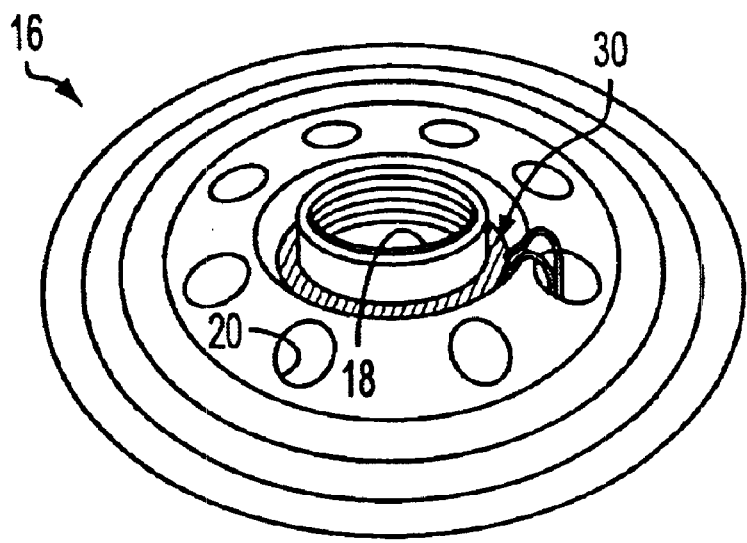
FIG. 2 is a perspective view of a tapping plate of the oil filter assembly of FIG. 1, showing an upper surface thereof.
Figure 3:
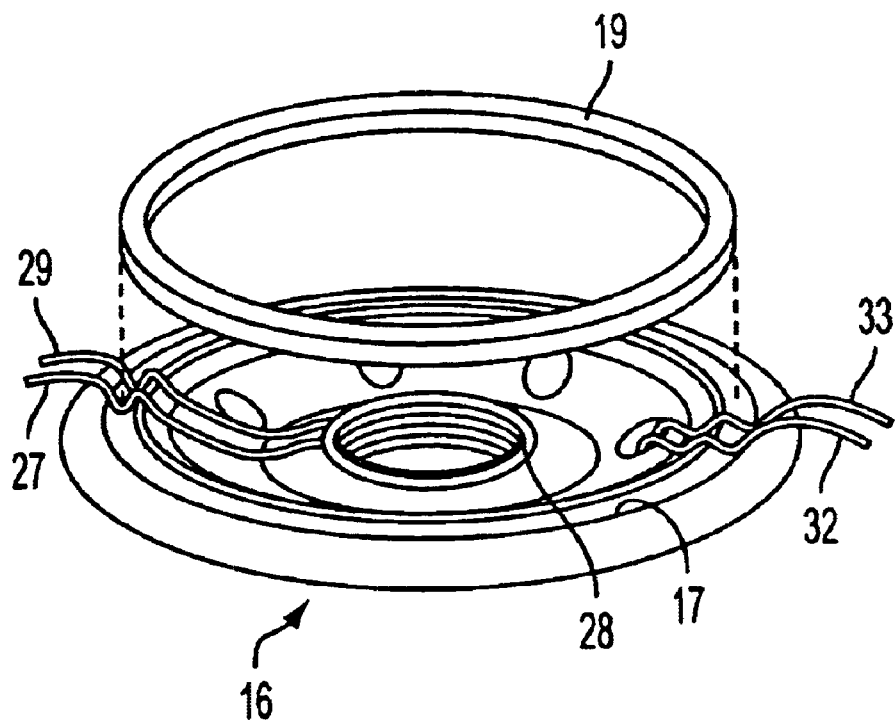
FIG. 3 is a perspective view of the filter tapping plate of FIG. 2, inverted from the orientation of FIG. 2 and showing a lower surface thereof.

Referring now to FIGS. 1–3, a first embodiment of a pressure-sensing fluid filter assembly, according to the present invention, is shown generally at 10. The filter assembly 10 in the embodiment of FIG. 1 includes a hollow filter housing 12, made up of an inverted substantially cup-shaped shell 14 and a base plate or tapping plate 16 attached to the shell.

The tapping plate 16 has a substantially circular outline, has a threaded outlet hole 18 formed centrally therethrough, and also has a plurality of inlet holes 20 formed therethrough. The inlet holes 20 are spaced radially outwardly away from the outlet hole 18, and are arranged in a circular pattern concentric with the outlet hole. The underside of the tapping plate 16 has an annular groove 17 formed therein which engagingly receives and seats a gasket 19 therein, for forming a fluid-tight seal against a mounting surface (not shown), such as an engine block.

The filter assembly 10 also includes a substantially cylindrical porous filter element 22 disposed substantially coaxially in the housing 12. The filter element 22 is a conventional component of the assembly 10. Preferably, but not necessarily, a reinforcing support frame 24 may be provided supportively surrounding the filter element 22, as shown in FIG. 1.

The filter assembly 10 also includes an annular inner seal 26 disposed inside the filter housing 12, between the filter element 22 and the tapping plate 16.

The filter housing 12 defines a fluid flow path therethrough, as shown by the sequence of arrows in FIG. 1. The flow path begins at the underside of the tapping plate 16, and extends through the inlet holes 20 and into the shell 14. The flow path then continues through the wall of the filter element 22, and then turns and passes outwardly from the housing 12 through the outlet hole 18.

The flow path has an upstream portion in all areas thereof before the filter element, and a downstream portion after the filter element.

After prolonged use, it is normal for the filter element 22 to become dirty and clogged due to soot and oil contamination factors. It will be understood that when the filter element 22 becomes clogged, because of the increased resistance to the passage of fluid through the element 22, the ambient fluid pressure in the upstream portion of the flow path will be considerably higher than the fluid pressure in the downstream portion thereof.

The filter assembly 10 also includes an inlet pressure sensor 28 attached to an area of the filter housing 12 in the upstream portion of the flow path. As shown in FIG. 1, the inlet pressure sensor 28 may be attached to the lower surface of the tapping plate 16. Alternatively, the inlet pressure sensor 28 may be placed on the upper surface of the tapping plate 16, radially outside of the annular inner seal 26, as shown in FIG. 5.

Figure 5:
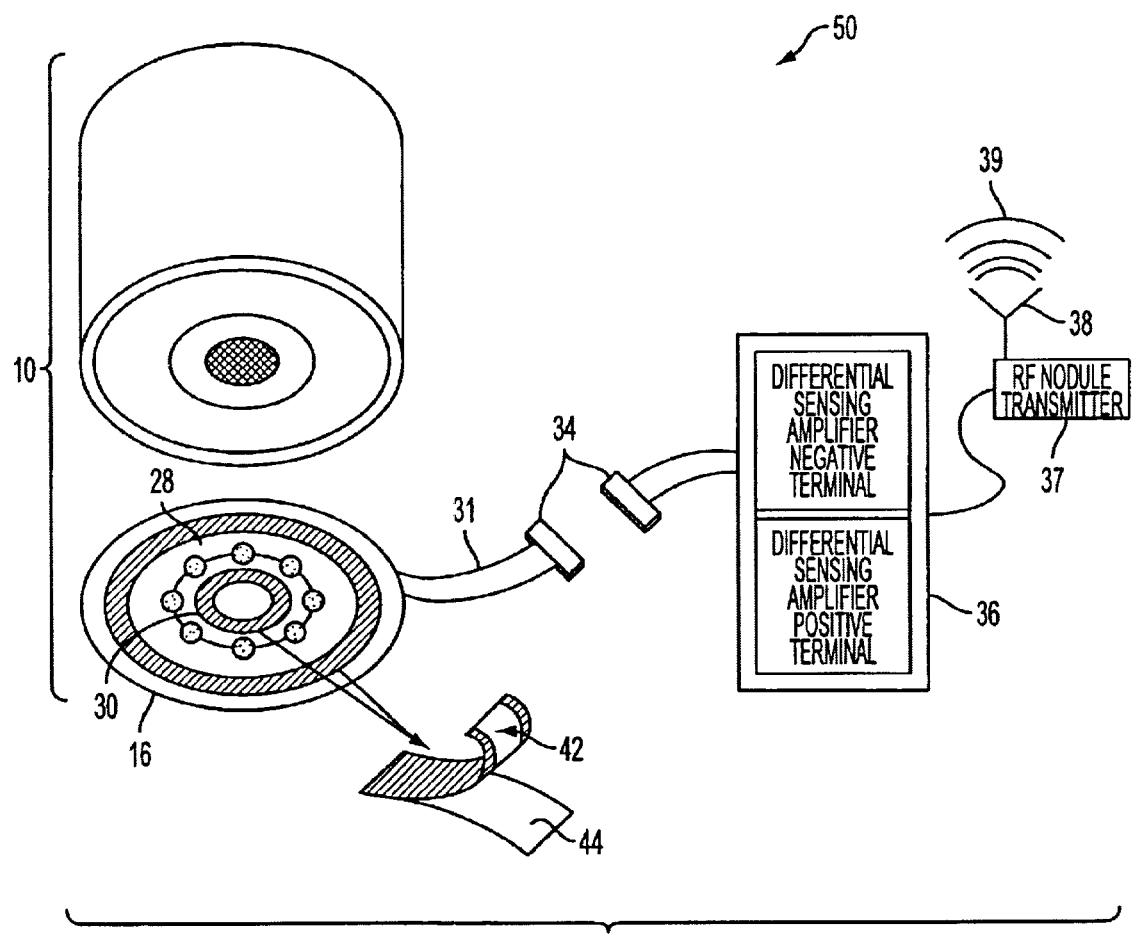
FIG. 5 is a simplified schematic diagram of a system according to the present invention, the system including the oil filter assembly of FIG. 1 as one component thereof.

Preferably, a first pair of fine wires 27, 29 are provided on the tapping plate 16 attached to and in electrical communication with the inlet pressure sensor 28, for connecting the inlet pressure sensor to a flexible cable 31 (FIG. 5). These wires 27, 29 may be referred to as electrical interconnects and are preferred to be routed under the sealing gasket 19.

In a low-cost embodiment of the invention, the filter assembly 10 may be provided with only a single, inlet pressure sensor 28, which may be connected to electronic monitoring equipment. Such monitoring equipment may be set to trip an alarm and send an appropriate signal to the driver when the inlet pressure exceeds a threshold value, indicating that the filter assembly 10 may be clogged, and that an oil change is needed.

Preferably, but not necessarily, the filter assembly 10 also includes an outlet pressure sensor 30 attached to an area of the filter housing 12 in the downstream portion of the flow path. Where dual sensors are used, the inlet and outlet pressure sensors 28, 30 are substantially identical to one another.

In the embodiment shown in FIG. 1, the outlet pressure sensor 30 is attached to the inner surface of the tapping plate 16, radially inside of the annular inner seal 26. This location will expose the outlet pressure sensor 30 to the ambient pressure downstream of the filter element 22. Alternatively, the outlet pressure sensor 30 could be situated on an apprropriate surface of the filter element support frame 24, or in any other suitable location downstream of the filter element 22, where the sensor will be exposed to the outlet fluid pressure.

Preferably, a second pair of fine wires 32, 33 are provided on the tapping plate 16 attached to and in electrical communication with the inlet pressure sensor 28, for connecting the inlet pressure sensor to a flexible cable 31 (FIG. 5). These wires 32, 33 may be referred to as electrical interconnects and are preferred to be routed outwardly through one of the inlet holes and also under the sealing gasket 19.

Figure 4:
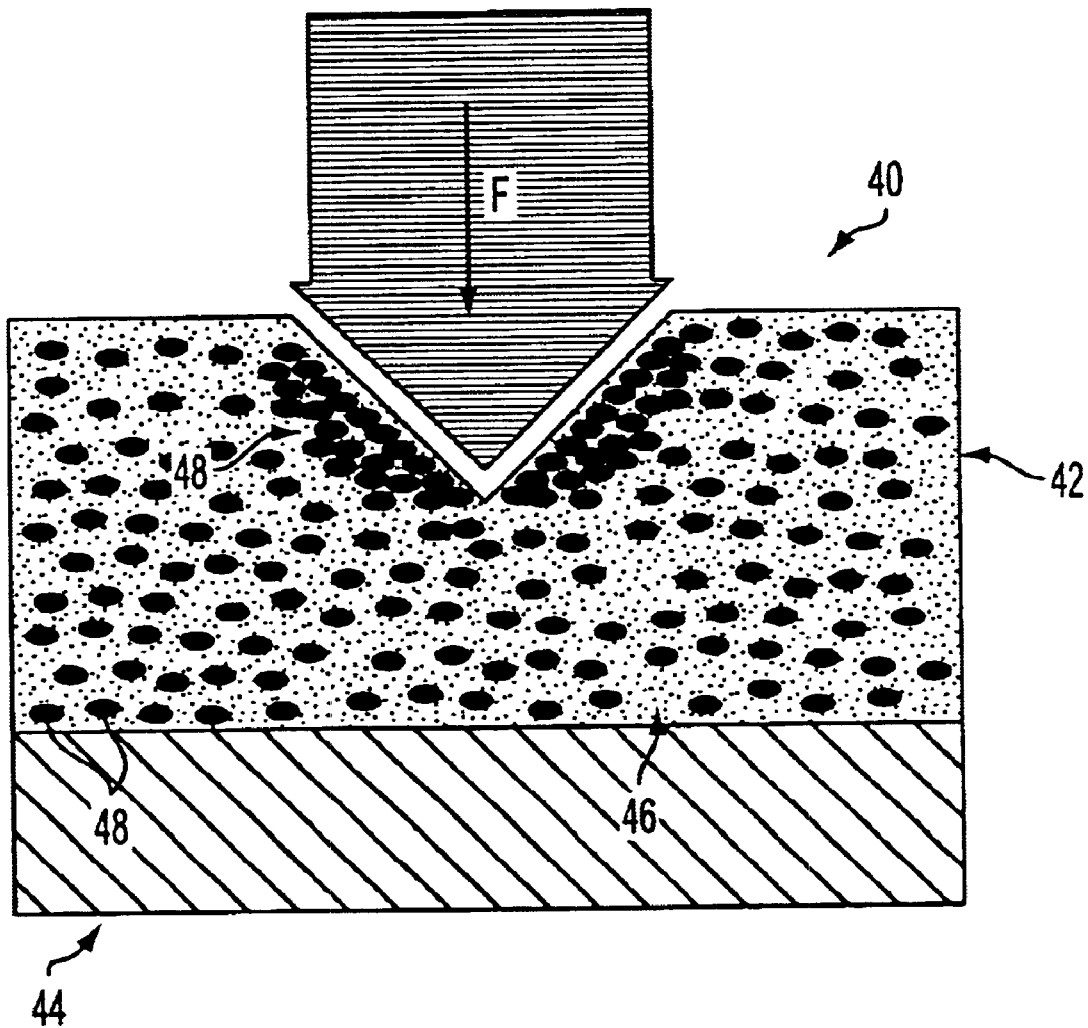
FIG. 4 is a cross-sectional diagram of a thick-film pressure sensor which is a component of the assembly of FIG. 1.

Referring now to FIG. 4, a pressure sensor 40 according to a preferred embodiment of the invention is shown in a detailed cross-sectional view. This is a bilayer polymer thick film (PTF) pressure sensor. The thickness of the film is preferred to be in a range between 5 and 15 mils.

In the depicted embodiment, the upper layer 42 is made up of a flexible pressure-sensitive film, while the lower layer 44 is an electrically conductive film. However, it will be understood that the layers may be reversed from the arrangement shown, so that the electrically conductive film could be the upper layer, and the pressure-sensitive film could be the lower layer. This alternative arrangement is also within the scope of the invention.

The sensor 40 of FIG. 4 could be used for either the inlet pressure sensor 28 or the outlet pressure sensor 30. Where dual sensors are used, each of the sensors 28, 30 is substantially similar to the sensor 40 of FIG. 4.

The conductive lower layer 44 is used to electrically interconnect the sensor 28 to appropriate external electronic equipment, which converts the sensor resistance to a pressure reading.

The conductive lower layer 44 is applied as a flowable conductive ink which can be applied by stencil, silk-screen, or inkjet printer. One commercially available conductive ink, which is suitable for use in the practice of the present invention, is sold by Methode Electronics, Inc. of Chicago, Ill. as product No. 1212. This ink may be applied in a predetermined pattern below the pressure-sensitive layer 42, or may be applied as a thin, substantially continuous band therebelow.

The pressure-sensitive upper layer 42 is made up of a flexible non-conductive polymeric matrix 46, having a multiplicity of conductive or semi-conductive particles 48 dispersed therein. When subjected to an applied force F, as shown by the large arrow in FIG. 4, the pressure-sensitive layer 42 is compressed, forcing the conductive particles 48 closer together. This crowding together of the conductive particles 48 leads to a decrease in resistance of the material, and this decrease in resistance is proportional to the applied force.

Material for producing pressure-sensitive film of a type suitable for forming the upper layer 42 is commercially available, and can be obtained from, for example, Chometrics, Inc., of Woburn, Mass. under the trademark CHO-FLEX 440X. This is applied as a flowable ink that can be applied by stencil, silk-screen, or inkj et printer. After applying, this product is typically cured by heating at 250 degrees F. for approximately 15 minutes.

3. Pressure Differential Sensing and Alerting System

Referring now to FIG. 5, a system 50 in accordance with another exemplary embodiment of the invention is shown.

The system 50 includes the pressure-sensing oil filter assembly 10 as previously discussed. The system 50 also includes an electronic control module or ECM 36 for coordinating system activities. The ECM preferably includes a microprocessor. The ECM 36 includes a register for receiving signals from the pressure sensors 28, 30 through flexible cable 31 and flex circuit connector 34. The ECM 36 further includes a calculating device for determining a difference between the signals from the pressure sensors, and for generating a pressure differential value corresponding thereto. The ECM 36 still further includes a comparing device for comparing the pressure differential value to a predetermined pressure value, corresponding to proper fluid quality.

Figure 6:
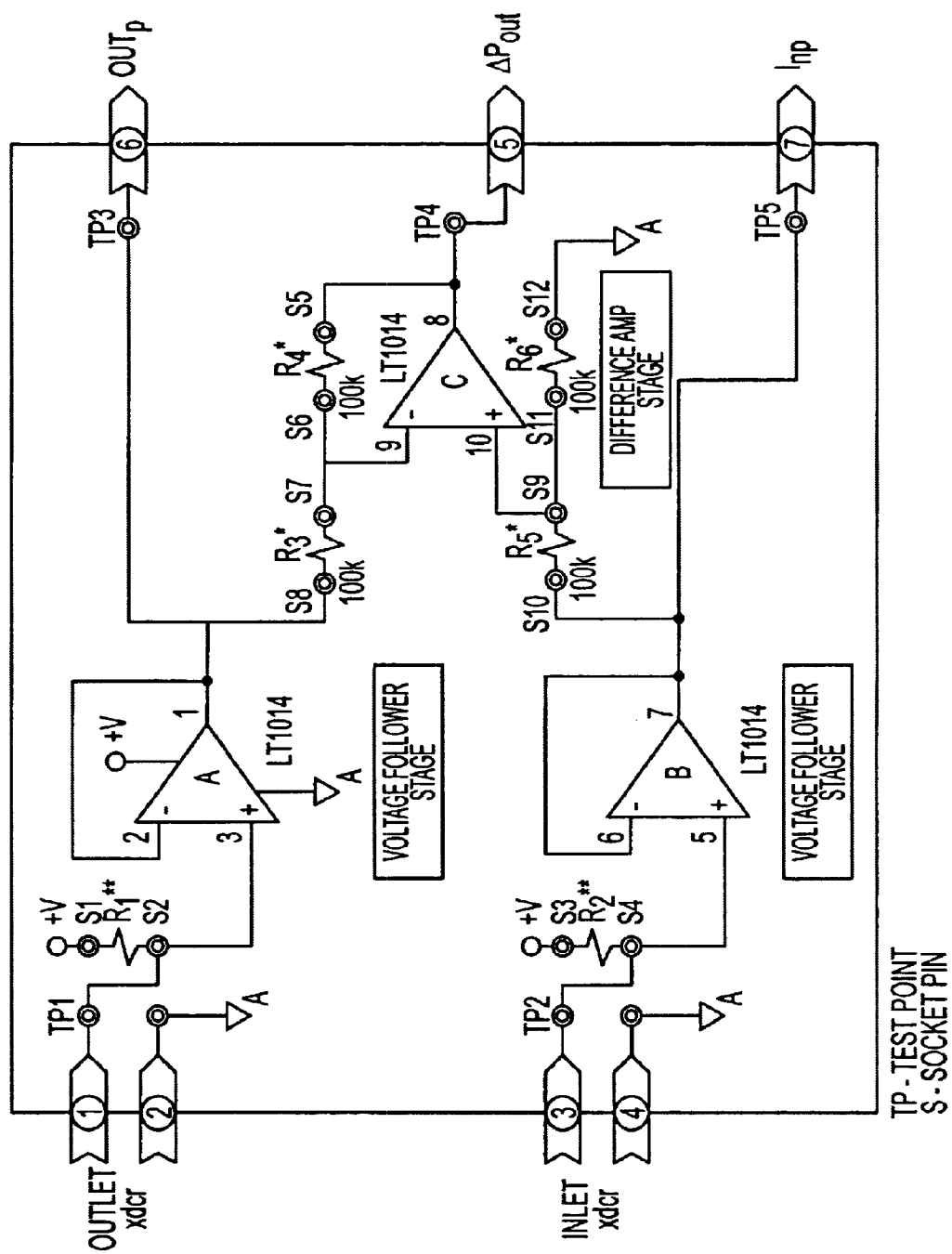
FIG. 6 is a simplified circuit diagram showing the operation of the system of FIG. 5.

FIG. 6 illustrates one possible design of an electrical schematic for the first part of the system 50.

In the depicted embodiment, the system 50 also includes a radio frequency (RF) transmitter 37 for sending a signal via an antenna 38 to a display terminal 39, in a manner determined by the comparing device. If the pressure in the filter is at an acceptable level, no signal need be sent. If the pressure or the pressure differential is outside of the acceptable range, the transmitter sends an appropriate alert signal to the display terminal 39. The display terminal 39 includes a receiver to receive the signal from the transmitter 37.

Most preferably, the display terminal 39 will give a message to an operator, indicating that an oil change is needed, when the inlet pressure value, or the pressure differential between the sensors 28, 30 exceeds a predetermined value.

4. Method

The present invention also includes a method of detecting a hydraulic fluid pressure differential in a fluid filter assembly 10.

The first step in the method is reading a first fluid pressure at an inlet sensor 28 including a pressure-sensitive film 42. As previously described, the inlet sensor 28 is situated in an inlet area of the filter assembly 10.

Another step of the method, which can be done simultaneously with the first step, is reading a second fluid pressure at an outlet sensor 30 including a pressure-sensitive film 42. As previously described, the outlet sensor is situated in an outlet area of the filter assembly 10.

Another step of the method, which can be done virtually simultaneously with the first and second steps, is generating inlet and outlet pressure signals corresponding to the first and second fluid pressures.

Once the inlet and outlet pressures have been read, the ECM 36 is given the readings and mathematically determines the difference between the values corresponding to the inlet and outlet pressure signals, to arrive at a value for the pressure differential. The ECM 36 then compares the value of the pressure differential to a predetermined value corresponding to proper fluid quality, and if appropriate, the ECM instructs the transmitter 37 to send a signal to the display terminal 39.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A pressure sensing fluid filter assembly, comprising:
    a filter housing comprising
        a substantially cup-shaped shell;
        a tapping plate attached to said shell, said tapping plate having a substantially circular outline and having a threaded outlet hole formed centrally therethrough and a plurality of inlet holes formed therethrough, the inlet holes spaced radially outwardly away from the outlet hole;
        a substantially cylindrical filter element disposed in said housing;
        wherein said filter housing defines a flow path for fluid flow therethrough beginning at the underside of the tapping plate, extending through the inlet holes and into the shell, the flow path then continuing through the filter element and outwardly through the outlet hole,
        said flow path having an upstream portion before the filter element and a downstream portion after the filter element; and
    an inlet pressure sensor attached to said tapping plate in the upstream portion of said flow path, said inlet pressure sensor comprising a pressure sensitive thick film having a surface contacting a surface of said tapping plate and comprising a flexible polymeric non-conductive matrix having a multiplicity of spaced apart conductive filler particles suspended therein.

2. The pressure sensing fluid filter assembly of claim 1, wherein the inlet pressure sensor further comprises an electrically conductive layer adjacent the pressure sensitive film.

3. A pressure sensing fluid filter assembly, comprising:
    a filter housing comprising
        a substantially cup-shaped shell;
        a tapping plate attached to said shell, said tapping plate having a substantially circular outline and having a threaded outlet hole formed centrally therethrough and a plurality of inlet holes formed therethrough, the inlet holes spaced radially outwardly away from the outlet hole;
        a substantially cylindrical filter element disposed in said housing;
        wherein said filter housing defines a flow path for fluid flow therethrough beginning at the underside of the tapping plate, extending through the inlet holes and into the shell, the flow path then continuing through the filter element and outwardly through the outlet hole,
        said flow path having an upstream portion before the filter element and a downstream portion after the filter element;
    an inlet pressure sensor attached to said tapping plate in the upstream portion of said flow path; and
    an outlet pressure sensor attached to said tapping plate in the downstream portion of said flow path,
    wherein each of said inlet and outlet pressure sensors comprise a pressure sensitive thick film having a surface contacting a surface of said tapping plate.

* * * * *